US010819926B2

(12) United States Patent
Aggarwal et al.

(10) Patent No.: US 10,819,926 B2
(45) Date of Patent: Oct. 27, 2020

(54) SYSTEMS AND METHODS FOR SYNCHRONIZING IMAGE SENSORS

(71) Applicant: FACEBOOK TECHNOLOGIES, LLC, Menlo Park, CA (US)

(72) Inventors: Gaurav Aggarwal, Mountain View, CA (US); Pravin Sajan Tamkhane, Mountain View, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/948,242

(22) Filed: Apr. 9, 2018

(65) Prior Publication Data

US 2019/0313039 A1   Oct. 10, 2019

(51) Int. Cl.
| | |
|---|---|
| H04N 5/355 | (2011.01) |
| H04N 5/235 | (2006.01) |
| G06F 3/01 | (2006.01) |
| H04N 5/04 | (2006.01) |
| G02B 27/01 | (2006.01) |
| H04N 5/225 | (2006.01) |
| H04N 5/232 | (2006.01) |

(52) U.S. Cl.
CPC ..... *H04N 5/35581* (2013.01); *G02B 27/0172* (2013.01); *G06F 3/012* (2013.01); *H04N 5/04* (2013.01); *H04N 5/2258* (2013.01); *H04N 5/2353* (2013.01); *H04N 5/23218* (2018.08)

(58) Field of Classification Search
CPC .... H04N 5/35581; H04N 5/04; H04N 5/2353; G02B 27/0172; G06F 3/012
See application file for complete search history.

(56) References Cited

U.S. PATENT DOCUMENTS

| | | | |
|---|---|---|---|
| 2009/0231465 A1* | 9/2009 | Senba | H04N 5/23248 348/229.1 |
| 2013/0286214 A1 | 10/2013 | Woo et al. | |
| 2014/0028861 A1* | 1/2014 | Holz | H04N 5/23277 348/208.4 |
| 2017/0142312 A1 | 5/2017 | Dal Mutto et al. | |
| 2017/0171433 A1 | 6/2017 | Ross et al. | |

FOREIGN PATENT DOCUMENTS

WO   2019/199612 A1   10/2019

OTHER PUBLICATIONS

International Search Report and Written Opinion received for PCT Application Serial No. PCT/US2019/026115 dated Jul. 8, 2019, 12 pages.

* cited by examiner

*Primary Examiner* — Twyler L Haskins
*Assistant Examiner* — Fayez Bhuiyan
(74) *Attorney, Agent, or Firm* — FisherBroyles, LLP

(57) ABSTRACT

This disclosure describes systems, methods, and devices related to the synchronization of image sensors with different exposure durations. In some embodiments, a system may include multiple image sensors, such as cameras, that have differing exposure durations. A data management component may be configured to receive sensor data from the image sensors. In addition, a synchronization component may be configured to transmit a shutter synchronization pulse to the image sensors. Finally, a tracking component may be configured to temporally center, based at least in part on the shutter synchronization pulse, the differing exposure durations of the image sensors. Various other systems and methods are also disclosed.

20 Claims, 9 Drawing Sheets

SYSTEMS AND METHODS FOR SYNCHRONIZING IMAGE SENSORS

BACKGROUND

Augmented reality (AR) and virtual reality (VR) eyewear devices or headsets may enable users to experience exciting events, such as interacting with people in a computer-generated simulation of a three-dimensional world or viewing data superimposed on a real-world view. AR/VR eyewear devices and headsets may also be used for purposes other than recreation—governments may use them for military training simulations, doctors may use them to practice surgery, and engineers may use them as visualization aids.

AR/VR systems often include multiple image sensors or cameras, either integrated within the eyewear devices or headsets themselves or mounted to various external devices or accessories. These image sensors often require differing exposure durations due to, for example, the image sensors being exposed to different lighting scenarios (e.g., bright versus dimly lit environments) and/or due to their intended purpose (e.g., longer exposure durations may be required for inside-out positional tracking of a VR headset than for tracking a VR controller with embedded infrared light emitting diodes).

Conventional attempts to synchronizing image sensors with differing exposure durations typically involve aligning the beginning of the sensors' respective exposure durations. However, if the beginning of these exposure durations are aligned, their center points will often be misaligned since they differ in length. Unfortunately, this may cause the centroids of objects or features that are captured during these exposure durations to be misaligned (especially if the headset/image sensors or the tracked objects or features are moving), which may result in errors in the computer vision computations used to track such objects or features. For example, a VR tracking system may have difficulty accurately tracking the head pose of a VR user if the centroids of objects that are captured by image sensors mounted at various locations on the VR headset do not align.

SUMMARY

As will be described in greater detail below, the instant disclosure describes various approaches to synchronizing image sensors with differing exposure durations to correctly track the objects and/or features within the frames captured by such image sensors. According to some embodiments, an apparatus capable of accomplishing such a task may include a data management component configured to receive sensor data from a plurality of image sensors that have differing exposure durations, a synchronization component configured to transmit a shutter synchronization pulse to the plurality of image sensors, and a tracking component configured to center the differing exposure durations of the plurality of image sensors. The differing exposure durations of the plurality of image sensors may be centered based at least in part on the shutter synchronization pulse.

In some examples, to temporally center the differing exposure durations, the tracking component may be also configured to (1) identify a first exposure duration of a first image sensor that is shorter than a second exposure duration of a second image sensor, (2) calculate, based at least in part on the first exposure duration's length and the second exposure duration's length, a blanking duration for the first exposure duration that will temporally center the first exposure duration with the second exposure duration, and then (3) instruct the synchronization component to add the blanking duration to the first exposure duration to temporally center the first exposure duration with the second exposure duration.

In some embodiments, one of the differing exposure durations may be associated with a dynamically changing light environment. In some examples, at least one of the image sensors may be configured to alternate between exposure durations of differing lengths. In these examples, an initial exposure duration within the alternating exposure durations of differing lengths may be shorter than a subsequent exposure duration within the alternating exposure durations of differing lengths. In addition, the tracking component may be configured to track, using sensor data obtained during the subsequent exposure duration, a head-mounted-display system that includes the plurality of image sensors. The tracking component may also be configured to track, using sensor data obtained during the initial exposure duration, an external controller associated with the head-mounted-display system. The sensor data obtained during the initial exposure duration may include an image of fiducials. In some examples, these fiducials may be a pattern of light emitted by infrared (IR) light emitting diodes (LEDs) within the external controller.

In addition, the tracking component may be configured to cause the at least one image sensor to alternately capture a positional tracking frame and a controller tracking frame. In some examples, the controller tracking frame may precede the positional tracking frame. In these examples, to temporally center an exposure duration of the positional tracking frame with an exposure duration of another positional tracking frame of another image sensor, the tracking component may be configured to (1) calculate a vertical timing size for the controller tracking frame that will cause the positional tracking frame to be temporally centered with the other positional tracking frame and (2) instruct the synchronization component to configure the at least one image sensor to use the calculated vertical timing size for the controller tracking frame to temporally center the positional tracking frame with the other positional tracking frame. In some embodiments, the shutter synchronization pulse may include a frame synchronization input.

Similarly, a corresponding system may include a plurality of image sensors that have differing exposure durations, a data management component configured to receive sensor data from the plurality of image sensors, a synchronization component configured to transmit a shutter synchronization pulse to the plurality of image sensors, and a tracking component configured to temporally center, based at least in part on the shutter synchronization pulse, the differing exposure durations of the plurality of image sensors.

In some embodiments, to temporally center the differing exposure durations, the tracking component may be configured to (1) identify a first exposure duration of a first image sensor that is shorter than a second exposure duration of a second image sensor, (2) calculate, based at least in part on the first exposure duration's length and the second exposure duration's length, a blanking duration for the first exposure duration that will temporally center the first exposure duration with the second exposure duration, and then (3) instruct the synchronization component to add the blanking duration to the first exposure duration to temporally center the first exposure duration with the second exposure duration.

The differing exposure durations may be associated with a dynamically changing light environment. In addition, at least one of the image sensors may be configured to alternate between a plurality of exposure durations of differing lengths. In one example, an initial exposure duration within the alternating exposure durations of differing lengths may be shorter than a subsequent exposure duration within the alternating exposure durations of differing lengths. In this example, the tracking component may be configured to track, using sensor data obtained during the subsequent exposure duration, a head-mounted-display system that includes the plurality of image sensors, and track, using sensor data obtained during the initial exposure duration, an external controller associated with the head-mounted-display system. The sensor data obtained during the initial exposure duration may include an image of a pattern of light emitted by IR LEDs within the external controller.

In addition, the tracking component may be configured to cause the at least one image sensor to alternately capture a positional tracking frame and a controller tracking frame. In some embodiments, the shutter synchronization pulse may represent a frame synchronization input, for example, via an event on a physical wire. In other embodiments, the frame synchronization input may be a command sent to the image sensors via a command bus protocol. The tracking component may also be configured to change an exposure duration for each of the plurality of image sensors.

A corresponding computer-implemented method may include identifying differing exposure durations for a plurality of image sensors, transmitting a shutter synchronization pulse to the plurality of image sensors, and temporally centering, based at least in part on the shutter synchronization pulse, the differing exposure durations of the plurality of image sensors.

In some examples, the above-described method may be encoded as computer-readable instructions on a computer-readable medium. For example, a computer-readable medium may include one or more computer-executable instructions that, when executed by at least one processor of a computing device, may cause the computing device to identify differing exposure durations for a plurality of image sensors, transmit a shutter synchronization pulse to the plurality of image sensors, and temporally center, based at least in part on the shutter synchronization pulse, the differing exposure durations of the plurality of image sensors.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
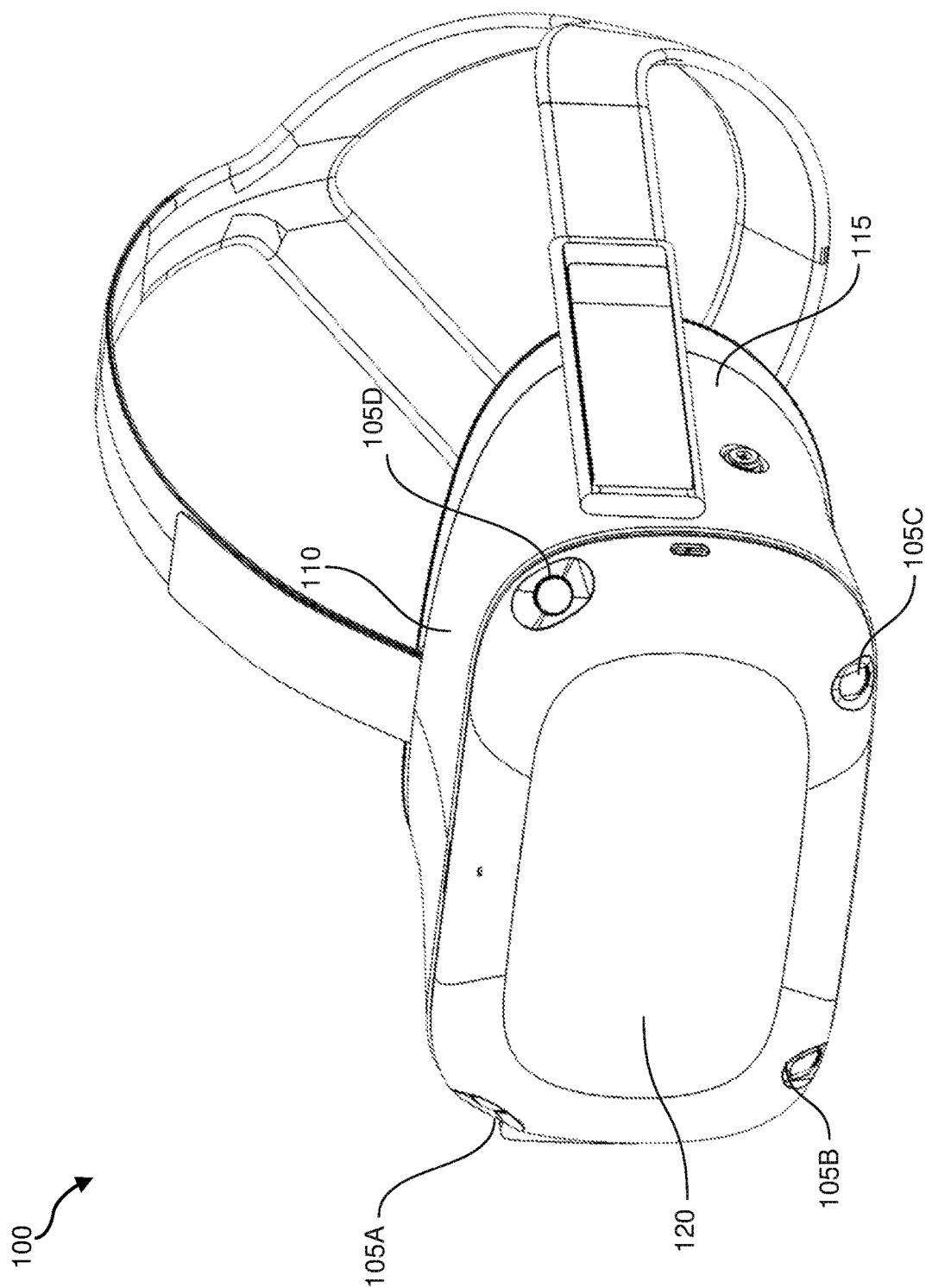
FIG. 1 is a perspective view of an exemplary head-mounted display that may be used in connection with or benefit from the systems and methods described herein.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to synchronizing image sensors with differing exposure durations. As detailed above, multiple image sensors may be mounted onto or embedded within the eyewear devices, headsets, or other accessories of AR or VR systems. These image sensors may capture images using different exposure durations based on, for example, their exposure to different lighting scenarios and/or their intended purpose (e.g., longer exposure durations may be required for inside-out positional tracking of a head-mounted display than for tracking a controller with embedded IR LEDs). Unfortunately, if these image sensors are not properly synchronized, the computer vision and/or tracking computations required to track objects or features captured by these image sensors may produce a variety of errors, potentially leading to an inferior user experience.

As will be described in greater detail below, to ensure that these image sensors are aligned in time and synchronized for tracking purposes, the systems described herein may first determine optimal exposure and gain values for each image sensor. The systems described herein may then use various blanking techniques (based, e.g., on both the determined values and an external reference signal, such as a shutter synchronization pulse), to center the exposure durations of each of the image sensors, ensuring that the image sensors are synchronized despite their differing exposure durations. By doing so, the systems described herein may be able to avoid or reduce the computer vision calculation issues detailed above, potentially resulting in a more accurate, realistic experience for the end user.

In some examples, the systems described herein may also configure one or more of these image sensors to alternate between exposure durations of differing lengths so that the same image sensor can be used for different purposes, such as both inside-out positional headset tracking and tracking a controller with embedded IR LEDs, potentially reducing the cost, weight, and/or complexity of the AR/VR system. By configuring an image sensor to alternate between different exposure lengths (e.g., by configuring an image sensor to interleave controller tracking frames with inside-out positional tracking frames), the systems described herein may enable the same image sensor to be used for different purposes. This may, in turn, significantly reduce the number of image sensors required by the resulting system, which may make the system both cheaper to manufacture and lighter, which may (in the case of a wearable device) make the resulting system more comfortable for end users to wear.

FIG. 1 depicts a perspective view of an exemplary head-mounted display 100 that may be used in connection with or benefit from the various systems and methods described herein. The head-mounted display 100 illustrated in this figure may include any of a variety of components associated with generating AR/VR experiences. Examples of such components include, without limitation, sensors (e.g., image sensors, audio sensors, inertial measurement units, etc.), computational components (e.g., general-purpose processors, special-purpose processors, etc.), communication components (e.g., wireless transceivers), display components (e.g., single or multiple display panels), and/or power management components (e.g., inductive charging components, batteries, etc.). For example, and as illustrated in FIG. 1, head-mounted display 100 may include multiple image sensors (e.g., cameras), such as image sensors 105A-105D, embedded in different sections of the head-mounted display 100 to capture images or data in its surrounding environment. Head-mounted display 100 may also include a power storage component or battery 110 to store power to enable the head-mounted display 100 to function. In addition, head-mounted display 100 may include spatial audio components 115 that enable the user to hear audio data generated by head-mounted display 100 as part of an AR or VR experience. In some embodiments, the image sensors 105A-105D may have an overlapping field of view. For example, the field of view (e.g., environment) seen by each sensor may overlap with another sensor. In another example, the image sensors 105A-105D may not have an overlapping view of view.

In some embodiments, head-mounted display 100 may include a plurality of display panels 120 configured to display computer-generated imagery (e.g., AR/VR imagery). In some examples, display panels 120 may permit the user to see the real-world using so-called pass-through cameras but may superimpose or augment the real-world view with additional computer-generated information. In some embodiments, and as will be described in greater detail in connection with FIG. 5 below, head-mounted display 100 may also include a variety of computational and/or communication components designed to facilitate the synchronization of image sensors 105.

Figure 2:
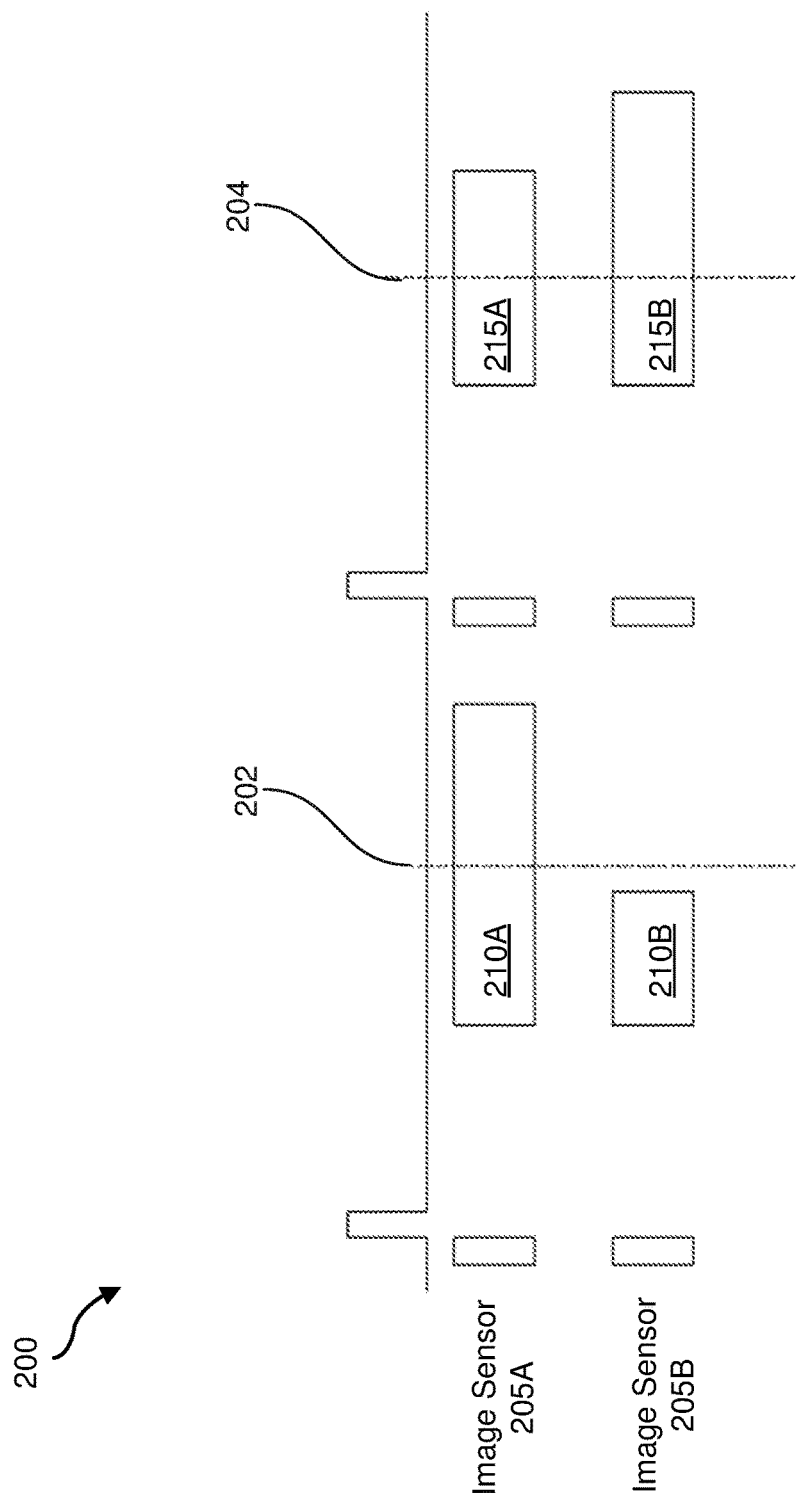
FIG. 2 is an illustration of an exemplary timeline that highlights the synchronization problems associated with utilizing image sensors with differing exposure durations in AR/VR and/or other computer-vision-related systems.

FIG. 2 is an illustration of an exemplary timeline 200 that highlights the synchronization problems associated with utilizing image sensors with differing exposure durations in AR/VR and/or other computer-vision-related systems. In both FIGS. 2-3, the horizontal axis represents time and the width of each of the boxes represents an exposure duration in units of time (e.g., milliseconds). As shown in this figure, the exposure durations 210A and 215A of image sensor 205A may be different from the exposure durations 210B and 215B of image sensor 205B, respectively. As detailed above, these exposure durations may differ for a variety of reasons, including, for example, the image sensors being exposed to different lighting scenarios (e.g., bright versus dimly lit environments) and/or due to their intended purpose (e.g., longer exposure durations may be required for inside-out positional tracking of a VR headset than for tracking a controller with embedded IR LEDs). For example, if image sensor 205A is facing a dark corner of a room while image sensor 205B is facing a brightly lit window, then image sensor 205A may require a longer exposure duration than image sensor 205B in order to capture enough light to accurately identify objects within the environment.

Conventional attempts to synchronize image sensors typically involve aligning the beginning of the sensors' respective exposure durations. For example, in conventional systems, the beginning of exposure duration 210A is typically aligned with the beginning of exposure duration 210B; similarly, the beginning of exposure duration 215A is typically aligned with the beginning of exposure duration 215B. However, as illustrated in this figure, because the beginning of exposure durations 210A and 210B are aligned, and because these exposure durations differ in length, the center of exposure durations 210A and 210B will be misaligned, as illustrated by divider 202. Similarly, the center of exposure durations 215A and 215B will also be misaligned, as illustrated by divider 204. Unfortunately, this may cause the centroids of objects or features that are captured during exposure durations 210A and 210B (and, similarly, exposure durations 215A and 215B) to be misaligned (especially if the headset/image sensors or the tracked objects or features are moving), which may result in errors in the computer vision computations used to track such objects or features (such as 3D tracking operations that rely on triangulation to accurately compute the depth of an object). For example, a VR tracking system may have difficulty accurately tracking the head pose of a VR user if the centroids of objects that are captured by image sensors mounted at various locations on the VR headset do not align.

Figure 3:
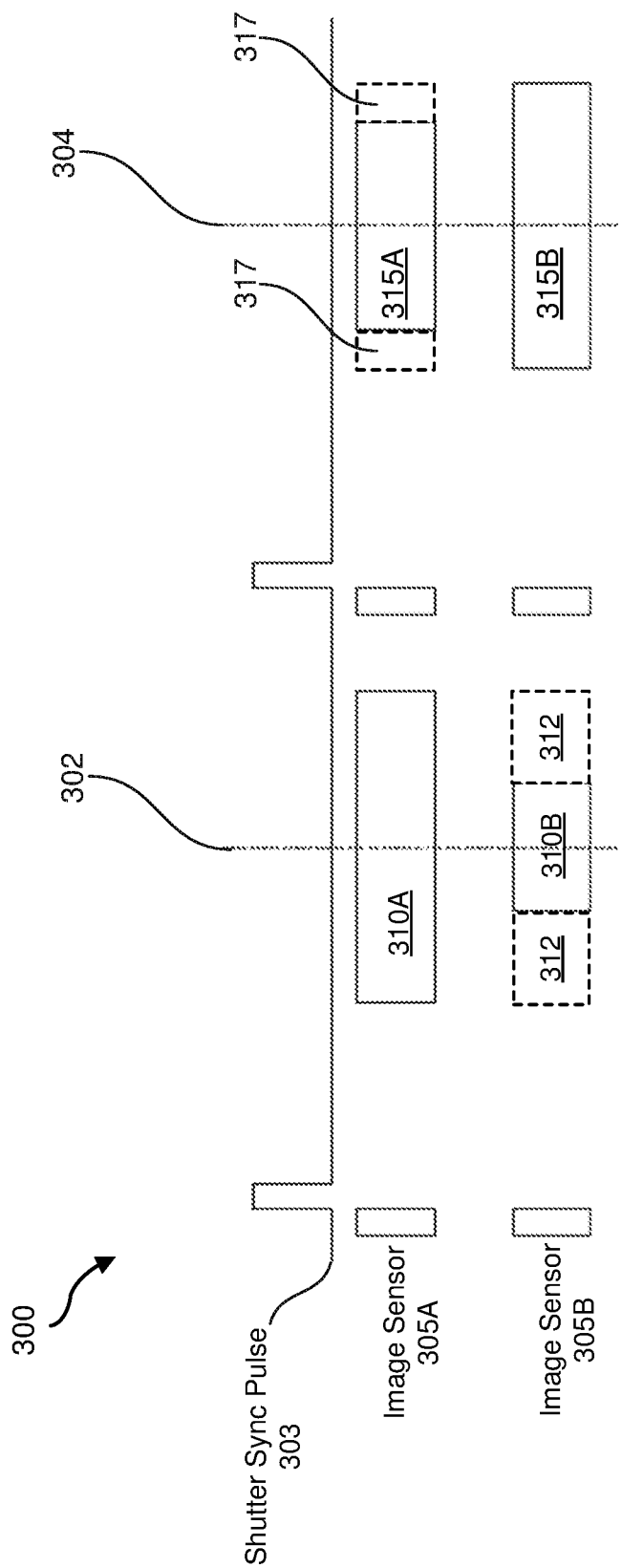
FIG. 3 is an illustration of an exemplary timeline depicting the synchronization of image sensors with differing exposure durations in accordance with one or more embodiments of the disclosure.

FIG. 3 is an illustration of an exemplary timeline 300 depicting the synchronization of image sensors with differing exposure durations in accordance with one or more embodiments of the disclosure. As with the exposure durations in FIG. 2, the exposure durations 310A and 315A of image sensor 305A in FIG. 3 may be different from the exposure durations 310B and 315B of image sensor 305B, respectively. However, utilizing techniques that will be explained in greater detail below in connection with FIGS. 5-8, the systems described herein may temporally center exposure durations 310A and 315A of image sensor 305A with exposure durations 310B and 315B of image sensor 305B, respectively (as shown by dividers 302 and 304), to ensure that the centroids of tracked features or objects captured during exposure durations 310A/310B and 315A/315B are correctly aligned. By doing so, the systems described herein may be able to avoid or reduce the computer vision calculation issues detailed above, potentially resulting in a more accurate, realistic experience for the end user.

As will be described in greater detail below in connection with FIGS. 5-8, the systems described herein may temporally center the differing exposure durations of image sensors in a variety of ways. In one example, the systems described herein may accomplish such a task by calculating a blanking duration to add to a shorter exposure duration of an image sensor so that the center of the shorter exposure duration aligns with the center of a longer exposure duration of another image sensor. The term "blanking duration" may, in some examples, refer to a per-frame delay time calculated for an exposure duration to ensure that the exposure duration is temporally centered with at least one other exposure duration of a differing length. In some examples, this blanking duration may be calculated based at least in part on the lengths of the exposure durations in question relative to an absolute time reference, such as a shutter synchronization pulse.

For example, as shown in FIG. 3, the systems described herein may calculate a blanking duration 312 for exposure duration 310B that, when added to exposure duration 310B, will cause the center of exposure duration 310B to be aligned with the center of exposure duration 310A (as illustrated by divider 302). Similarly, the systems described herein may calculate a blanking duration 317 for exposure duration 315A that, when added to exposure duration 315A, will cause the center of exposure duration 315A to be centered with the center of exposure duration 315B (as illustrated by divider 304).

In the example illustrated in FIG. 3, the center of exposure duration 310A may be approximately 15 milliseconds (ms) from the start of shutter synchronization pulse 303. In this example, the systems described herein may calculate blanking duration 312 for exposure duration 310B to ensure that the center of exposure duration 310B is also approximately 15 ms from the start of shutter synchronization pulse 303. In other words, blanking duration 312 may offset or delay the capture of data by image sensor 305B during exposure duration 310B to ensure that the centroids of tracked objects or features captured during exposure duration 310B are aligned with the centroids of the same objects or features captured by image sensor 305A during exposure duration 310A.

Figure 4:
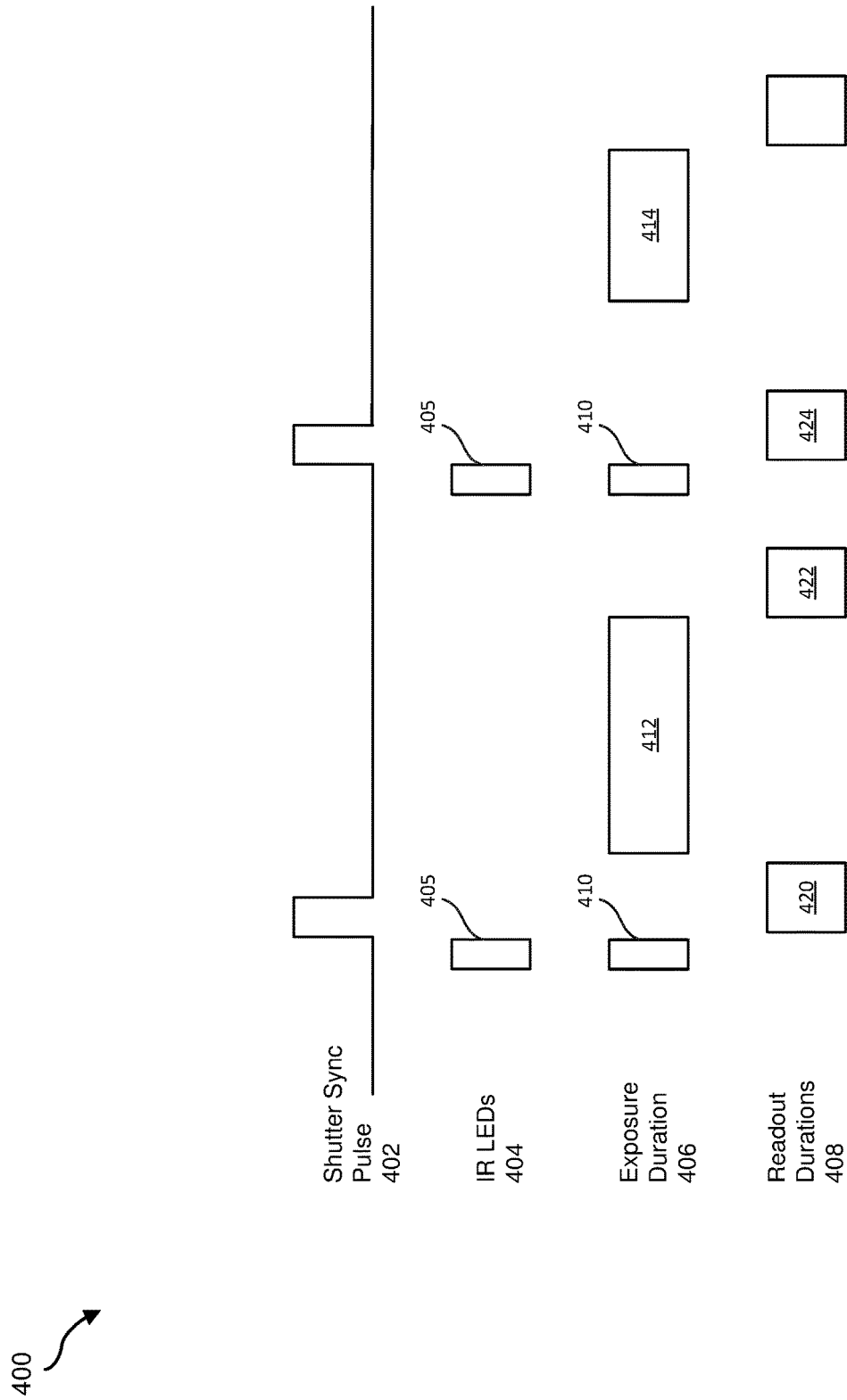
FIG. 4 is an illustration of an exemplary timeline of an image sensor that has been configured to alternate between exposure durations of differing lengths in accordance with one or more embodiments of the present disclosure.

In some examples, the systems described herein may also configure an image sensor to alternate between exposure durations of differing lengths so that the same image sensor can be used for different purposes. FIG. 4 is an illustration of an exemplary timeline 400 for such a system. As shown in this figure, an image sensor may be configured with different exposure duration 406 for a variety of different purposes, such as both inside-out positional tracking of a VR headset and tracking an associated VR controller with embedded IR LEDs. For example, the systems described herein may configure an image sensor to alternate between a plurality of exposure durations of differing lengths, such as short exposure durations 410 (which may be used, e.g., for controller tracking) and long exposure durations 412 and 414 (which may be used, e.g., for inside-out positional tracking of the VR headset). In this example, short exposure durations 410 may be approximately 15-100 microseconds (us) in length, while long exposure durations 412 and 414 may range from approximately 1 ms to approximately 14 ms in length.

In the example illustrated in FIG. 4, frames captured by the image sensor may be read out (during, e.g., readout durations 408) to permit the image sensor to reset and capture the next data frame. In this example, a shutter synchronization pulse 402 may be used to indicate the beginning of the short exposure durations 410 that are used for controller tracking. In addition, IR LEDs 404 embedded within the controller may emit a pattern of light that, when captured by the image sensor, may enable a tracking or computer vision component to track the controller (a process commonly referred to as "constellation tracking"). In some embodiments, the IR LEDs 404 may be on for a relatively short duration 405 and use low power. In these embodiments, the image sensor may be configured with a short exposure duration (e.g., short exposure duration 410) that corresponds to the short duration 405 during which the IR LEDs 404 emit light.

In some embodiments, the short exposure durations 410 used for controller tracking may be much shorter in length than the exposure durations (e.g., long exposure durations 412 and 414) that are used for inside-out positional tracking (e.g., approximately 15-100 µs versus approximately 1 to 10 ms), but similar or equal in length to the on time of the IR LEDs 404 (which may be, e.g., approximately 15-100 µs in length). In these embodiments, the relatively short length of short exposure duration 410 may help the image sensor isolate or detect the IR LEDs 404 as bright spots on a dark background since this short exposure duration may not allow much light to enter the image sensor.

Upon completion of short exposure duration 410, the frame captured by the image sensor during the short exposure duration 410 may be read out to memory during readout duration 420. After this frame has been read out from the image sensor to memory, the image sensor may then begin capturing sensor data for the duration of long exposure duration 412. In contrast to short exposure durations 410, the image sensor may use long exposure durations 412 and 414 to capture frames for inside-out positional tracking of a VR headset. As detailed above, inside-out positional tracking may require significantly more light (and thus more exposure time) than IR LED constellation tracking. As such, long exposure durations 412 and 414 may be significantly longer than short exposure durations 410 (e.g., approximately 1-10 ms versus approximately 15-100 µs). As explained above, image sensors may require different exposure durations based on their exposure to different lighting scenarios (e.g., dimly lit environments may require longer exposure durations than brightly lit environments). As such, while short exposure durations 410 may remain relatively static in length, long exposure durations 412 and 414 may vary in length depending on the lighting scenario. Upon completion of long exposure duration 412, the frame captured by the image sensor during long exposure duration 412 may be read out to memory (during, e.g., readout duration 422). The entire cycle may then repeat upon receipt of another shutter synchronization pulse 402. In some embodiments, the above-described cycle may repeat based on an internal state machine of the image sensor that keeps repeating the cycle based on configuration settings of image sensors enabled by the computing device.

By configuring an image sensor to alternate between different exposure lengths (e.g., by configuring an image sensor to interleave controller tracking frames with inside-out positional tracking frames), the systems described herein may enable the same image sensor to be used for different purposes. This may, in turn, significantly reduce the number of image sensors required by the resulting system, which may make the system cheaper to manufacture, lighter, and more comfortable to wear.

Figure 5:
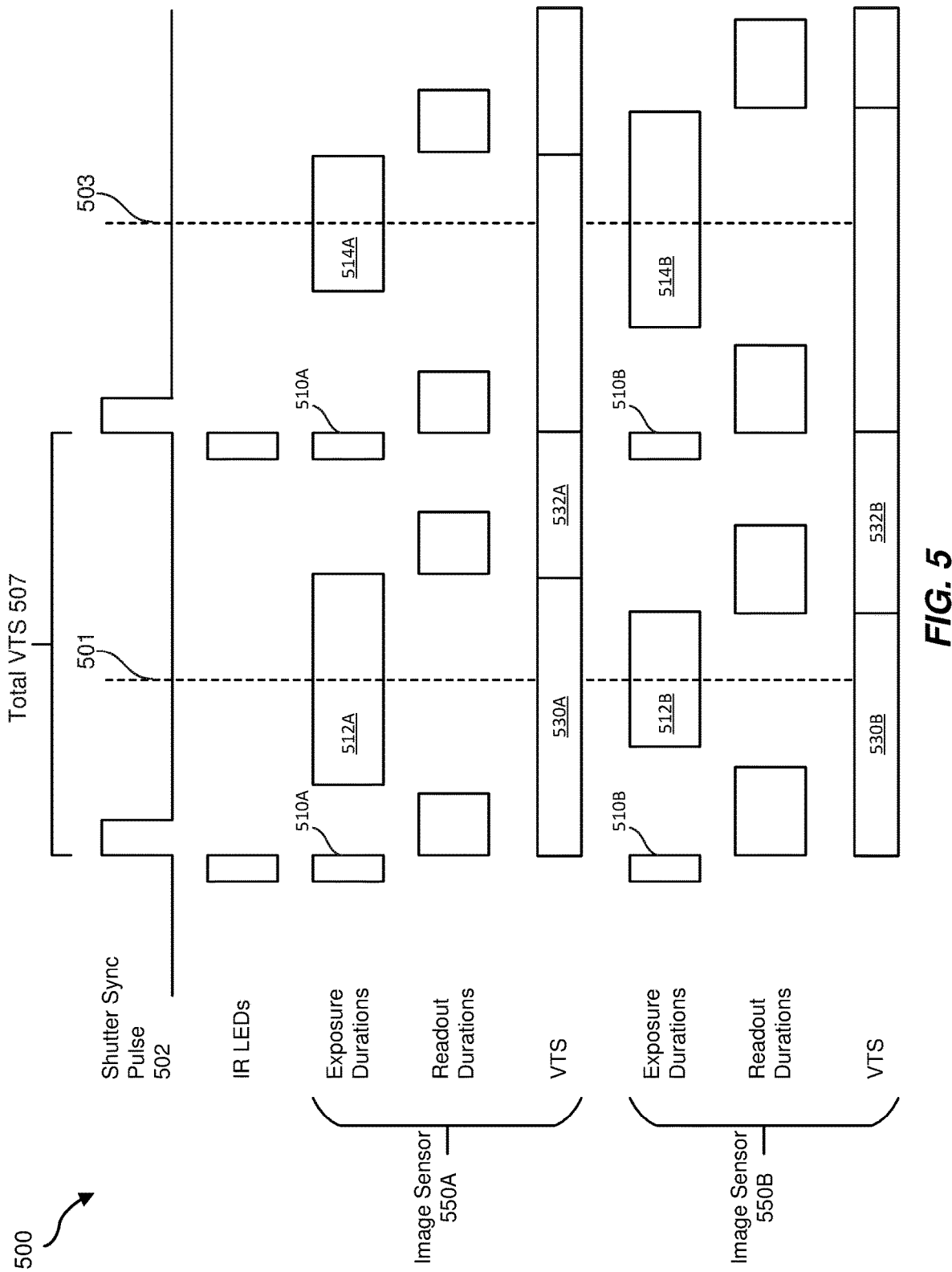
FIG. 5 is an illustration of an exemplary timeline in which the synchronization and frame interleaving concepts from FIGS. 3 and 4 have been combined.

In some embodiments, the centering or synchronization concepts outlined above in connection with FIG. 3 may be combined with the frame interleaving concepts discussed in connection with FIG. 4. FIG. 5 is an illustration of an exemplary timeline 500 for such a system. In this example, the systems described herein may configure a first image sensor 550A to alternate between exposure durations of differing lengths, such as short exposure durations 510A (used, e.g., for controller tracking) and long exposure durations 512A, 514A (used, e.g., for inside-out positional tracking), as detailed above in connection with FIG. 4. The systems described herein may similarly configure a second image sensor 550B to alternate between exposure durations of differing lengths, such as short exposure durations 510B (used, e.g., for controller tracking) and long exposure durations 512B, 514B (used, e.g., for inside-out positional tracking). In this example, the systems described herein may temporally center the interleaved exposure durations 512A and 514A of image sensor 550A with the interleaved exposure durations 512B and 514B of image sensor 550B, respectively (as shown by dividers 501 and 503), to ensure that the centroids of tracked features or objects captured during exposure durations 512A/512B and 514A/514B are correctly aligned. By doing so, the systems described herein may be able to avoid or reduce the computer vision calculation issues detailed above, potentially resulting in a more accurate, realistic experience for the end user.

As will be described in greater detail below in connection with FIGS. 6-9, the systems described herein may temporally center the interleaved exposure durations of different image sensors in a variety of ways. In one example, the systems described herein may accomplish such a task by (1) identifying a controller tracking frame (e.g., short exposure duration 510B) that precedes a positional tracking frame (e.g., long exposure duration 512B) and then (2) calculating a vertical timing size (VTS) for the controller tracking frame that will cause the positional tracking frame to be temporally centered with another positional tracking frame of another image sensor (such as exposure duration 512A of image sensor 550A). For example, in the timeline 500 illustrated in FIG. 5, the systems described herein may calculate a VTS 530B for short exposure duration 510B that will cause long exposure duration 512B of image sensor 550B to be temporally centered with long exposure duration 512A of image sensor 550A. In some examples, the total VTS 507 for a short-long exposure duration pair (e.g., the combined total of VTS 530A and VTS 532A or the combined total of VTS 530B and VTS 532B) will be equivalent to the duration of shutter synchronization pulse 502. The term "vertical timing size" (or simply VTS) may, in some examples, refer to the number of clock cycles needed to maintain a specific framerate. In some examples, the VTS may be represented in other units, such as a number of line periods of an image sensor.

Figure 6:
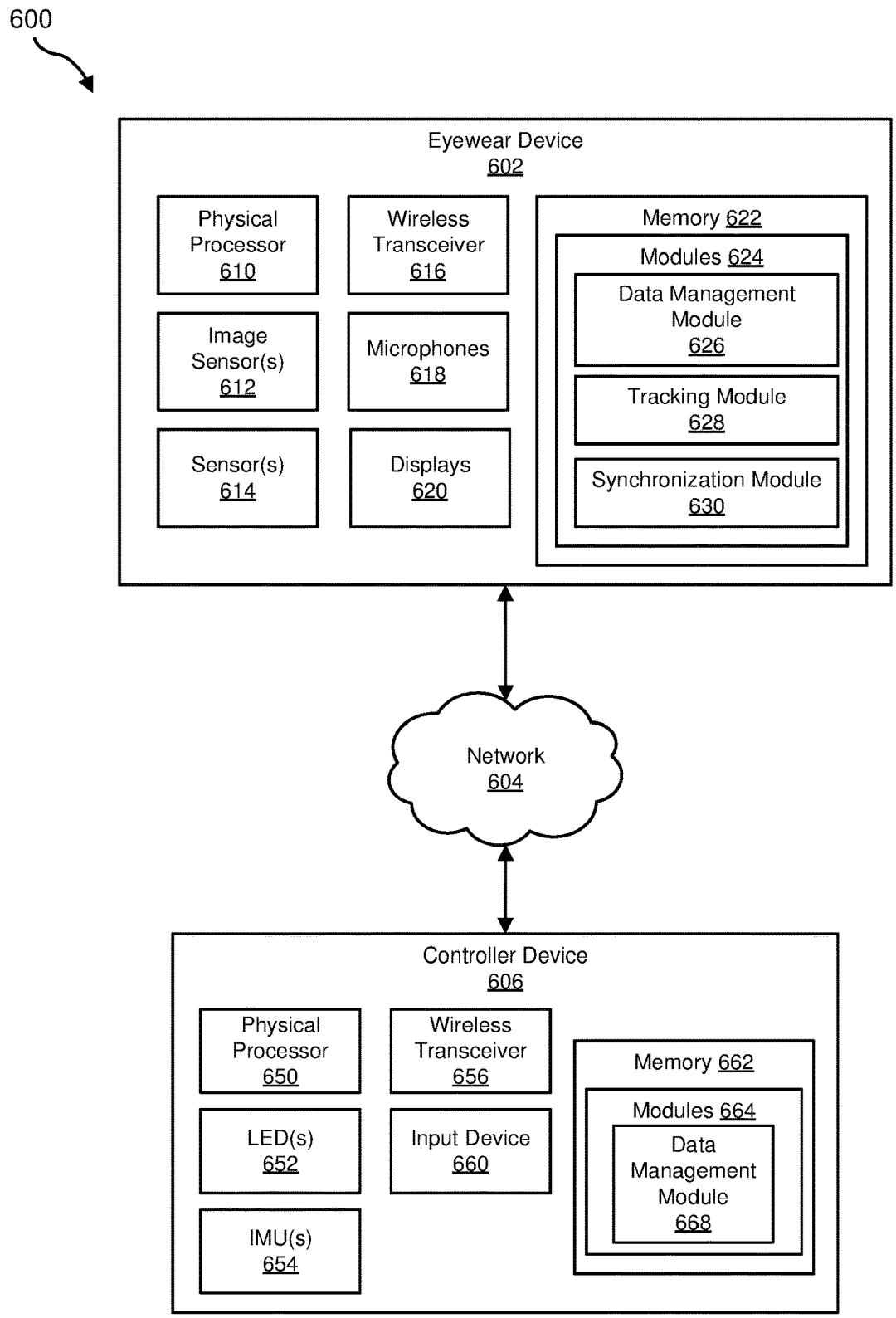
FIG. 6 is a block diagram of an exemplary system capable of implementing and/or being used in connection with the methods described herein.

Any of a variety of systems, devices, and/or components may be used to synchronize image sensors with differing exposure durations and/or to alternate between (i.e., interleave) frames of differing exposure lengths within the same image sensor. FIG. 6 is a block diagram of one such system. As illustrated in this figure, exemplary system 600 may include an eyewear device 602 in communication with a controller device 606. Eyewear device 602 generally represents any type or form of device capable of displaying computer-generated imagery. Examples of eyewear device 602 include, without limitation, AR glasses, VR headsets and head-mounted displays (HMDs), etc.

In some embodiments, eyewear device 602 may include one or more physical processors, such as physical processor 610. In one example, physical processor 610 may access and/or modify one or more of modules 624 stored in memory 622. Additionally, or alternatively, physical processor 610 may execute one or more of modules 624 to synchronize the image sensors of eyewear device 602.

In some embodiments, eyewear device 602 may include one or more image sensors 612. Image sensors 612 may represent any type of image sensor that may be mounted or embedded in an eyewear device or headset and/or an external device and that is capable of capturing image data, such as pictures or video data. Examples of image sensors 612 may include, but are not limited to, red green blue (RGB) cameras, monochrome cameras, and depth-sensing cameras. Each of image sensors 612 may be configured to determine various configuration settings for different aspects of image capture, such as optimal exposure durations or gain values based on lighting scenarios of the image sensors 612.

In some embodiments, eyewear device 602 may include one or more additional sensors 614. Examples of sensors 614 may include, but are not limited to, infrared sensors (e.g., to track hand movements, eye movements inside the eyewear device 602, etc.), photocell sensors (e.g., sensors that detect light), and/or IMUs (designed, e.g., to detect specific forces and/or angular rates of eyewear device 602). In some embodiments, eyewear device 602 may also include gyroscopes, accelerometers, and magnetometers, which may provide rich sensor input that can be interpreted by eyewear device 602 as highly accurate and complex movements of a user.

In some embodiments, eyewear device 602 may include at least one wireless transceiver 616. Wireless transceiver 616 generally represents any suitable radio and/or wireless transceiver for transmitting and/or receiving signals in the bandwidth and/or channels corresponding to the communications protocols utilized by eyewear device 602 and controller device 606.

In some examples, eyewear device 602 may include one or more microphones 618. Microphones 618 may represent any type of audio sensor that may be mounted or embedded in eyewear device 602 and that is capable of capturing audio data, such as environmental sounds or the voice of a user. Eyewear device 602 may also include one or more speakers configured to play any audio data received.

In some embodiments, eyewear device 602 may include one or more displays 620. Displays 620 may represent any type or form of display panel that may be mounted or embedded in eyewear device 602 and that is capable of presenting data to the user. Examples of displays 620 include, without limitation, liquid crystal displays (LCDs), liquid crystal on silicon (LCos), or organic light-emitting diodes (OLEDs). In some examples, displays 620 may include multiple micro-displays to increase total resolution and field of view. In addition, displays 620 may display only computer-generated imagery (CGI), only live imagery from the physical world, or a combination thereof. In one example, displays 620 may have corresponding lenses and/or semi-transparent mirrors embedded in eyewear device 602.

As illustrated in FIG. 6, example eyewear device 602 may also include one or more memory devices, such as memory 622. In certain embodiments, one or more of modules 624 in FIG. 6 may represent one or more software applications or programs that, when executed by a computing device, may cause the computing device to perform one or more tasks. For example, and as will be described in greater detail below, one or more of modules 624 may represent modules stored and configured to run on eyewear device 602. One or more of modules 624 may also represent all or portions of one or more special-purpose processors configured to perform one or more tasks.

In at least one embodiment, eyewear device 602 may include a data management module 626 that manages the data flow to and from eyewear device 602 and/or modules 624. For example, data management module 626 may communicate with image sensors 612 and/or sensors 614, microphones 618, and/or displays 620 to receive and/or transmit data accordingly.

In at least one embodiment, eyewear device 602 may include a tracking module 628, which may determine optimal exposure and gain values for each image sensor (in order, e.g., to maximize analog gain to reduce motion blur). In this embodiment, tracking module 628 may receive data from one or more of image sensors 612 and/or data management module 626. In one example, tracking module 628 may receive an indication of a respective exposure duration for each of the image sensors 612 and may center the differing exposure durations of the image sensors 612, as discussed in connection with FIGS. 3 and 7-8. In one example, tracking module 628 may change the exposure or gain on every frame.

In at least one embodiment, eyewear device 602 may include a synchronization module 630 that receives data from data management module 626 and/or tracking module 628. For example, synchronization module 628 may receive an instruction to transmit a shutter synchronization pulse to image sensors 612. In this example, the shutter synchronization pulse may be used as an absolute time reference by image sensors 612 to ensure that the image sensors are synchronized, as discussed above in connection with FIG. 3.

Eyewear device 602 may be coupled to controller device 606 over one or more networks 604. Network 604 may include, but is not limited to, any one of a combination of different types of suitable communications networks such as, for example, public networks (e.g., the Internet), private networks, wireless networks, cellular networks, or any other suitable private and/or public networks. Further, any portion of network 604 may have any suitable communication range associated therewith and may include, for example, global networks (e.g., the Internet), metropolitan area networks (MANS), wide area networks (WANs), local area networks (LANs), or personal area networks (PANS). In addition, any portion of network 604 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

As detailed above, in one example eyewear device 602 may be in communication with a controller device 606. In some embodiments, controller device 606 may include one or more physical processors, such as physical processor 650. In one example, physical processor 650 may access and/or modify one or more of modules 664 stored in memory 662.

In some embodiments, controller device 606 may include one or more LEDs 652. In some embodiments, LEDs 652 may represent IR LEDs. As detailed above, LEDs 652 may produce a pattern of light captured by image sensors 612 of eyewear device 602, which eyewear device 602 may use to track controller device 606. For example, LEDs 652 may flash in accordance with a system-defined shutter duration, which may, as detailed above, be shorter than the exposure duration for frames used for inside-out positional tracking.

In one example, controller device 606 may include one or more IMUs 654, which may be used to capture movement of controller device 606. The data captured by IMUs 654 may be used as input for the AR/VR system associated with eyewear device 602. In some embodiments, controller device 606 may include at least one wireless transceiver 656 similar to the wireless transceiver 616 of eyewear device 602.

In some embodiments, controller device 606 may include an input device 660. Input device 660 generally represents any type or form of mechanism capable of capturing data from a user, such as a pointer, trackpad, touchpad, keyboard, or the like. The data captured by input device 660 may be transmitted to the eyewear device 602 and/or an external computing device for further processing.

Controller device 606 may also include one or more memory devices, such as memory 662. As with memory 622, memory 662 generally represents any type or form of volatile or non-volatile storage device or medium capable of storing data and/or computer-readable instructions. In one example, memory 662 may store, load, and/or maintain one or more of modules 664.

In at least one embodiment, controller device 606 may include a variety of modules 664, such as a data management module 668 that transmits and receives data to and/or from eyewear device 602 and/or an external computing device. Data management module 668 may manage collection of data from any of the components of controller device 606 and/or transmission of data to any of the components of controller device 606.

Figure 7:
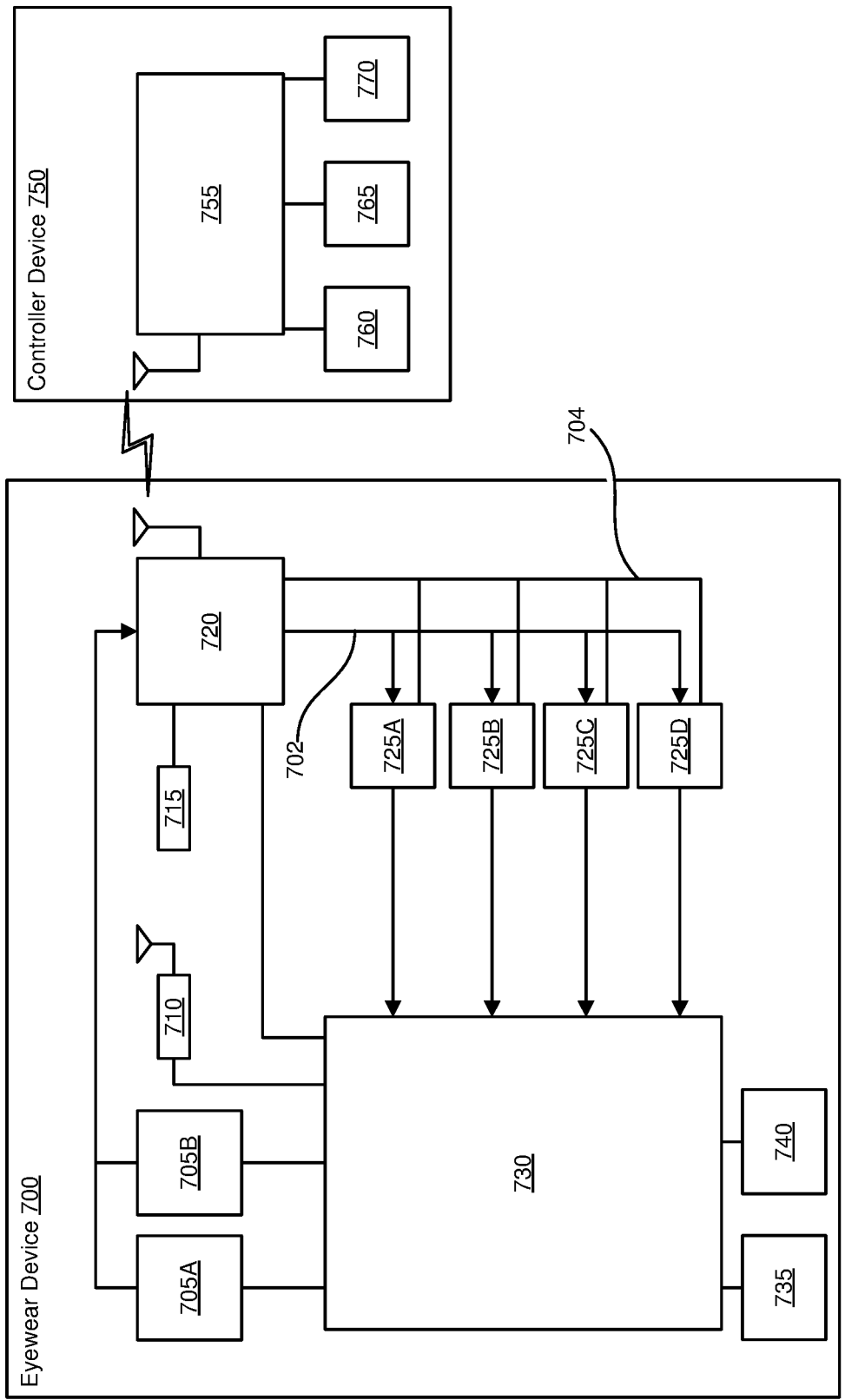
FIG. 7 is a block diagram of an exemplary implementation of the system illustrated in FIG. 6.

FIG. 7 is an illustration of an exemplary implementation of the system 600 illustrated in FIG. 6. In this example, an exemplary eyewear device 700 may be in communication with a controller device 750. As shown in FIG. 7, eyewear device 700 may include a system on a chip (SoC) 730. SoC 730 may represent an integrated circuit that integrates various components of a computer system on a single substrate. In one example, SoC 730 may receive represent a data management component configured to receive data from and/or transmit data to an external computing system or device (such as a controller device 750) using a wireless transceiver 710. Wireless transceiver 710 may represent any suitable radio and/or wireless transceiver capable of transmitting and/or receiving signals in the bandwidth and/or channels corresponding to the communications protocols utilized by eyewear device 700. In one example, SoC 730 may receive data from one or more image sensors 725A, 725B, 725C, 725D (collectively 725) over MIPI CSI, which may serve as an interface between image sensors 725 and a host processor (e.g., SoC 730).

In one example, SoC 730 may be configured to process data (received, e.g., from an external computing device, image sensors 725, etc.). In some examples, SoC 730 may utilize audio codec 735 to process audio data. SoC 730 may also be configured to receive data obtained from a proximity sensor 740. Proximity sensor 740 may be configured to detect nearby objects (e.g., a user's face) and transmit the proximity data to SoC 730. SoC 730 may also process and/or transmit for processing data received from other components of eyewear device 700. This processed data may then be used to display information on display panels 705A, 705B (collectively 705) of eyewear device 700. In some embodiments, display panels 705 may communicate with a synchronization module 720 to ensure vertical synchronization.

Synchronization module 720 may be configured to receive data from a variety of different components, such as an inertial measurement unit (IMU) 715 and/or SoC 730. For example, synchronization module 720 may receive data from IMU 715, which may capture specific forces and/or angular rates of eyewear device 700. The data captured by IMU 715 may be transmitted to SoC 730 for use by the AR or VR system.

In some examples, synchronization module 720 may be configured to communicate with image sensors 725A, 725B, 725C, 725D (collectively 725) via frame synchronization input (FSIN) 702 and/or via an inter-integrated circuit 704 (which may represent an I2C device). Synchronization module 720 may be coupled to image sensors 725 through respective wires from synchronization module 720 to a respective FISN pin of each of the image sensors. In one example, synchronization module 720 may transmit a shutter synchronization pulse to image sensors 725, which may provide an absolute time reference to aid in synchronizing the image sensors 725, as detailed above in connection with FIGS. 1-5. Each image sensor 725 may also have a unique I2C address, which synchronization module 720 may use to control each image sensor 725 individually.

In some embodiments, synchronization module 720 may communicate with a synchronization module 755 of the controller device 750. In these embodiments, synchronization module 720 of the eyewear device 700 and synchronization module 755 of the controller device 750 may communicate over a wireless personal area network (WPAN). In some embodiments, the WPAN may be a low-powered PAN carried over a short-distance wireless network technology. For example, synchronization module 720 and synchronization module 755 may communicate using a low-rate WPAN, such as IEEE 802.15.4.

In one example, synchronization module 755 of the controller device 750 may manage the flow of data to and/or from controller device 750 and manage components of the controller device 750 (e.g., LEDs 760, IMUs 765, input devices 770, etc.).

In some embodiments, LEDs 760 may represent IR LEDs, which may emit light that is not visible to humans. LEDs 760 may also be low-powered. As detailed above, these IR LEDs may be powered on for short durations of time at specified intervals. IR LEDs 760 may also be arranged in a pattern or produce a pattern of light that may be captured by image sensors 725 of eyewear device 700. Eyewear device 700 (specifically, SoC 730) may then use the captured patterns of the IR LEDs 760 to track controller device 750, as detailed above.

The IMUs 765 of controller device 750 may be designed, for example, to detect specific forces and/or angular rates of controller device 750. The data captured by IMUs 765 may be transmitted to eyewear device 700, for example, by synchronization module 755. The data from IMUs 765 may then be processed and used by the AR or VR system associated with eyewear device 700 as the user interacts with the AR or VR system.

In some embodiments, controller device 750 may include one or more input devices 770. Input devices 770, which may be designed to capture data from a user, may take a variety of forms, such as a pointer, trackpad, keyboard, button, or the like. The data captured by the input device 770 may be transmitted to eyewear device 700 and/or and to an external computing device for further processing.

Figure 8:
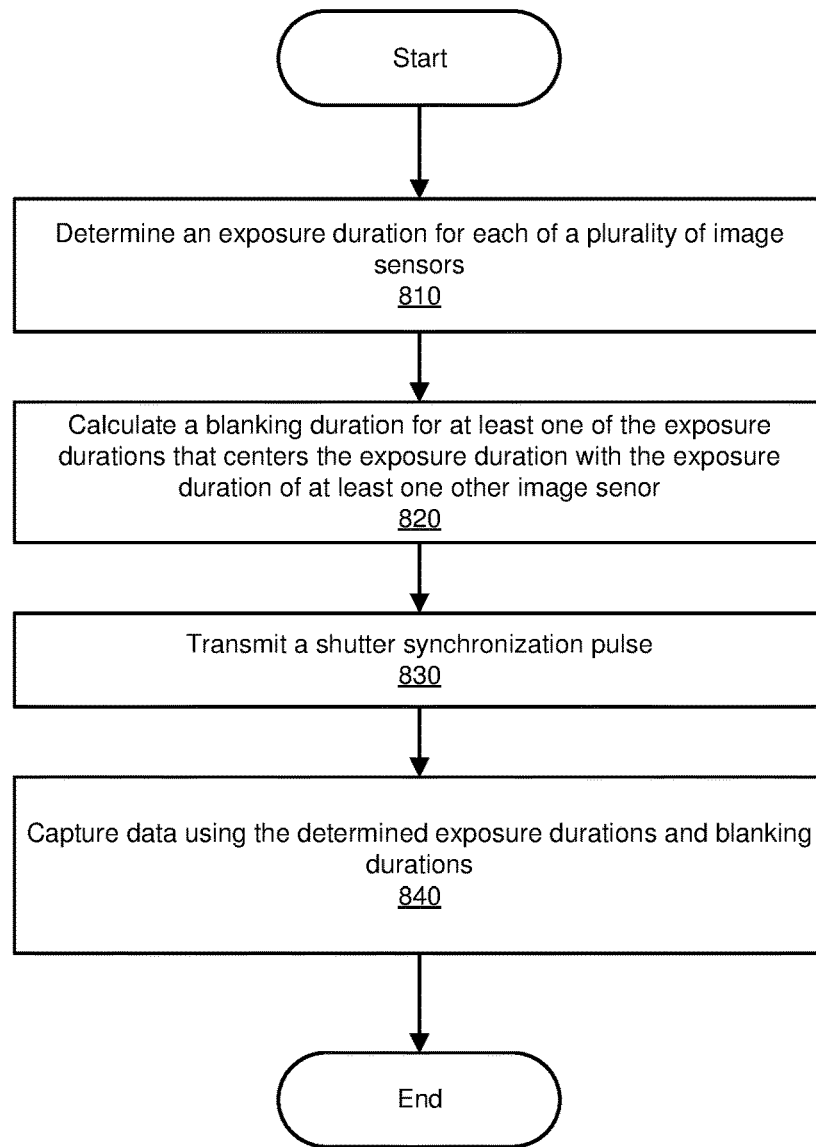
FIG. 8 is a flow diagram of a method for synchronizing image sensors with differing exposure durations in accordance with one or more embodiments of the present disclosure.

FIG. 8 is a flow diagram of an exemplary computer-implemented method 800 for synchronizing image sensors with differing exposure durations. Method 800 may be implemented by any suitable computer-executable code and/or computing system, including the systems illustrated in FIG. 1, 6, or 7. In one example, each of the steps shown in FIG. 8 may represent an algorithm whose structure includes and/or is represented by multiple sub-steps, examples of which will be provided in greater detail below.

As illustrated in FIG. 8, at step 810, one or more of the systems described herein may determine an exposure duration for each of a plurality of image sensors, such as image sensors 612 in FIG. 6. The systems described herein may perform step 810 in a variety of ways. In some embodiments, tracking module 628 in FIG. 6 may identify or determine an exposure duration for each image sensor 612 based on the image sensor's current lighting scenario and/or intended use, as determined by tracking module 628 based on data received from data management module 626 and/or image sensors 612. In some examples, tracking module 628 may also determine multiple exposure durations for a single image sensor, such as when a single image sensor is being used for both inside-out positional tracking and controller tracking, as detailed above in connection with FIGS. 4-5. In one example, tracking module 628 may configure (or cause another component, such as synchronization module 630, to configure) each image sensor 612 to capture sensor data in accordance with the exposure durations determined in step 810 (by, e.g., writing to various registers within image sensors 612).

At step 820, the systems described here may calculate a blanking duration for at least one of the exposure durations determined in step 810. The systems described herein may perform step 820 in a variety of ways. In one example, tracking module 628 may (using, e.g., one or more of the techniques outlined above in connection with FIGS. 3-5) use blanking techniques to temporally center the exposure durations of image sensors 612. In some examples, synchronization module 630 may then configure (or cause another component to configure) each image sensor 612 to capture sensor data in accordance with the blanking durations determined in step 820 (by, e.g., writing to various registers within image sensors 612).

At step 830, the systems described herein may transmit a shutter synchronization pulse to each image sensor. The systems described herein may perform step 830 in a variety of ways. In one example, synchronization module 630 may transmit the synchronization pulse to each image sensor 612 via a FSIN (such as FSIN 702 in FIG. 7). As detailed above, this synchronization pulse may serve as an absolute time reference to aid in synchronizing image sensors 612.

At step 840, the systems described herein may capture data in accordance with the exposure and blanking durations determined in step 810 and 820. Tracking module 628 may then read out frames from image sensors 612 to permit image sensors 612 to reset to capture additional frames.

Figure 9:
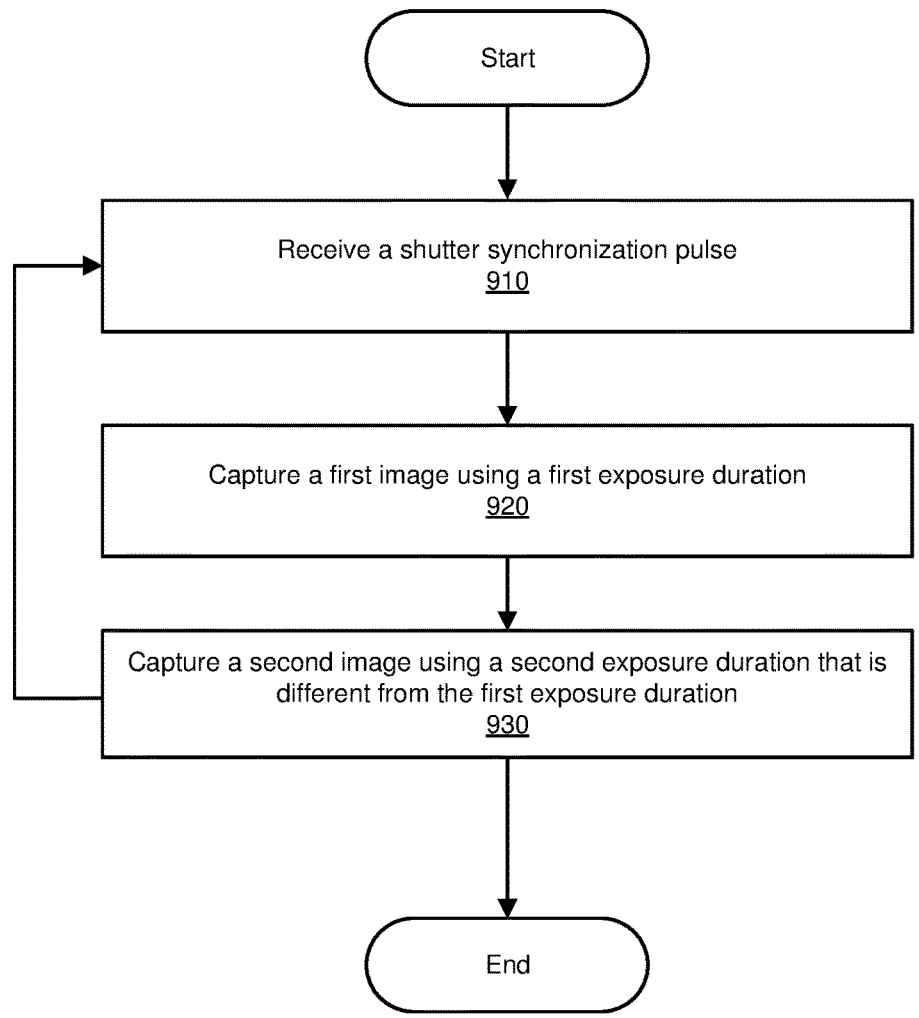
FIG. 9 is a flow diagram of a method for interleaving frames with differing exposure durations in accordance with one or more embodiments of the present disclosure.

FIG. 9 is a flow diagram of a method 900 for interleaving frames with differing exposure durations in accordance with one or more embodiments of the present disclosure. Method 900 may be implemented by any suitable computer-executable code and/or computing system, including the systems illustrated in FIG. 1, 6, or 7. In one example, each of the steps shown in FIG. 9 may represent an algorithm whose structure includes and/or is represented by multiple sub-steps, examples of which will be provided in greater detail below.

As illustrated in FIG. 9, at step 910, one or more image sensors may receive a shutter synchronization pulse. In one example, this shutter synchronization pulse may be received on an FSIN pin of the image sensor 612, as detailed above in connection with FIG. 6. As detailed above, the image sensor may use this shutter synchronization pulse as an absolute time reference to ensure that the image sensor is synchronized with other image sensors.

At block 920, the image sensor may capture a first image using a first exposure duration. In one example, this exposure duration may have been calculated or chosen (by, e.g., tracking module 628 in FIG. 6) based on a specific lighting scenario encountered by the image sensor and/or for a specific purpose (e.g., for tracking a controller with embedded IR LEDs and/or for inside-out positional tracking).

At block 930, the same image sensor may capture a second image using a second exposure duration that is different from the first exposure duration. As detailed above, exposure durations for inside-out positional tracking may require longer exposures to capture room-scale features than tracking controllers with embedded IR LEDs. In addition, image sensors may require different exposure durations due to differing lighting scenarios (e.g., bright versus dimly lit environments). In some embodiments, either or both of the exposure durations from steps 920 and 930 may be centered with the exposure durations of additional image sensors, as detailed above in connection with FIGS. 3-5 and 8.

As detailed above, the systems described herein may have multiple image sensors mounted onto or embedded therein. These image sensors may capture images with different exposure values based on their exposure to different lighting scenarios and/or their intended use (e.g., controller versus positional tracking). A tracking component may calculate optimal exposure and gain values for each image sensor. Based on the determined values, the duration of the exposure durations for each of the image sensors may be centered, ensuring that the image sensors are synchronized despite their different exposure levels. In addition, in some examples, interleaved frames captured by the image sensors may be used for different purposes, such as positional tracking and controller tracking.

The systems and methods described herein may be used in connection with any of a variety of different AR/VR eyewear devices (e.g., AR glasses), headsets (e.g., head-mounted-displays), and/or accessories (e.g., outside-in cameras, controllers, cases, etc.). In addition, while this disclosure discusses synchronizing image sensors in the context of AR/VR systems, the methods and systems described herein may also apply to non-AR/VR environments. For example, the concepts disclosed herein may be used in connection with any type or form of system that utilizes multiple image sensors with differing exposure durations, such as computer-vision-related systems designed to locate and/or track objects within the frames captured by such sensors.

The computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data indicating an exposure duration value for each image sensor to be transformed, centering the exposure duration for each image sensors, capture image data using the image sensors based on the centered exposure durations for each image sensor, use the result of the transformation to ensure the image sensors are properly synchronized to capture an object despite the different exposure durations of the different image sensors, and store the result of the transformation to further synchronize the image sensors. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
    a data management component configured to receive sensor data from a plurality of image sensors that have differing exposure durations;
    a synchronization component configured to transmit a shutter synchronization pulse to the plurality of image sensors; and
    a tracking component configured to center, based at least in part on the shutter synchronization pulse, based at least in part on the lengths of the differing exposure durations of the plurality of image sensors, and based at least in part on a memory read-out time during which the sensor data captured by the image sensor is read out to memory, the differing exposure durations of the plurality of image sensors.

2. The apparatus of claim 1, wherein, to center the differing exposure durations, the tracking component is further configured to:
    identify a first exposure duration of a first image sensor that is shorter than a second exposure duration of a second image sensor;
    calculate, based at least in part on the first exposure duration's length and the second exposure duration's length, a blanking duration for the first exposure duration that will center the first exposure duration with the second exposure duration; and
    instruct the synchronization component to add the blanking duration to the first exposure duration to center the first exposure duration with the second exposure duration.

3. The apparatus of claim 1, wherein at least one of the differing exposure durations is associated with a dynamically changing light environment.

4. The apparatus of claim 1, wherein at least one image sensor within the plurality of image sensors is configured to alternate between a plurality of exposure durations of differing lengths.

5. The apparatus of claim 4, wherein an initial exposure duration within the alternating exposure durations of differing lengths is shorter than a subsequent exposure duration within the alternating exposure durations of differing lengths.

6. The apparatus of claim 5, wherein the tracking component is further configured to:
    track, using sensor data obtained during the subsequent exposure duration, a head-mounted-display system that includes the plurality of image sensors; and
    track, using sensor data obtained during the initial exposure duration, an external controller associated with the head-mounted-display system.

7. The apparatus of claim 6, wherein the sensor data obtained during the initial exposure duration comprises an image of a pattern of light emitted by infrared light emitting diodes within the external controller.

8. The apparatus of claim 4, wherein the tracking component is further configured to cause the at least one image sensor to alternately capture a positional tracking frame and a controller tracking frame.

9. The apparatus of claim 8, wherein:
    the controller tracking frame precedes the positional tracking frame; and
    to center an exposure duration of the positional tracking frame with an exposure duration of another positional tracking frame of another image sensor, the tracking component is further configured to:
        calculate a vertical timing size for the controller tracking frame that will cause the positional tracking frame to be centered with the other positional tracking frame; and
        instruct the synchronization component to configure the at least one image sensor to use the calculated vertical timing size for the controller tracking frame to center the positional tracking frame with the other positional tracking frame.

10. The apparatus of claim 1, wherein the shutter synchronization pulse comprises a frame synchronization input.

11. A system comprising:
    a plurality of image sensors that have differing exposure durations;
    a data management component configured to receive sensor data from the plurality of image sensors;
    a synchronization component configured to transmit a shutter synchronization pulse to the plurality of image sensors; and
    a tracking component configured to center, based at least in part on the shutter synchronization pulse, based at least in part on the lengths of the differing exposure durations of the plurality of image sensors, and based at least in part on a memory read-out time during which the sensor data captured by the image sensor is read out to memory, the differing exposure durations of the plurality of image sensors.

12. The system of claim 11, wherein, to center the differing exposure durations, the tracking component is further configured to:

identify a first exposure duration of a first image sensor that is shorter than a second exposure duration of a second image sensor;

calculate, based at least in part on the first exposure duration's length and the second exposure duration's length, a blanking duration for the first exposure duration that will center the first exposure duration with the second exposure duration; and instruct the synchronization component to add the blanking duration to the first exposure duration to center the first exposure duration with the second exposure duration.

13. The system of claim 11, wherein at least one of the differing exposure durations is associated with a dynamically changing light environment.

14. The system of claim 11, wherein at least one image sensor within the plurality of image sensors is configured to alternate between a plurality of exposure durations of differing lengths.

15. The system of claim 14, wherein an initial exposure duration within the alternating exposure durations of differing lengths is shorter than a subsequent exposure duration within the alternating exposure durations of differing lengths.

16. The system of claim 15, wherein the tracking component is further configured to:

track, using sensor data obtained during the subsequent exposure duration, a head-mounted-display system that includes the plurality of image sensors; and track, using sensor data obtained during the initial exposure duration, an external controller associated with the head-mounted-display system.

17. The system of claim 16, wherein the sensor data obtained during the initial exposure duration comprises an image of a pattern of light emitted by infrared light emitting diodes within the external controller.

18. The system of claim 15, wherein the tracking component is further configured to cause the at least one image sensor to alternately capture a positional tracking frame and a controller tracking frame.

19. The system of claim 11, wherein the tracking component is configured to change an exposure duration for each of the plurality of image sensors.

20. A computer-implemented method comprising:

identifying differing exposure durations for a plurality of image sensors;

transmitting a shutter synchronization pulse to the plurality of image sensors; and centering, based at least in part on the shutter synchronization pulse, based at least in part on the lengths of the differing exposure durations of the plurality of image sensors, and based at least in part on a memory read-out time during which the sensor data captured by the image sensor is read out to memory, the differing exposure durations of the plurality of image sensors.

* * * * *